(12) United States Patent
Shinoda et al.

(10) Patent No.: US 7,636,292 B2
(45) Date of Patent: Dec. 22, 2009

(54) LENS HOLDING MEMBER, FOCUSING LENS USING LENS HOLDING MEMBER, OPTICAL PICKUP APPARATUS AND OPTICAL RECORDING AND REPRODUCING APPARATUS

(75) Inventors: Masataka Shinoda, Kanagawa (JP); Kimihiro Saito, Saitama (JP); Takao Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 856 days.

(21) Appl. No.: 11/216,214

(22) Filed: Sep. 1, 2005

(65) Prior Publication Data

US 2006/0077789 A1    Apr. 13, 2006

(30) Foreign Application Priority Data

Sep. 14, 2004  (JP) ............................. 2004-267396
Feb. 22, 2005  (JP) ............................. 2005-045735

(51) Int. Cl.
*G11B 7/00*    (2006.01)

(52) U.S. Cl. ............................. 369/112.23; 369/112.01; 369/44.23; 369/44.14

(58) Field of Classification Search ....................... None
See application file for complete search history.

(56) References Cited

U.S. PATENT DOCUMENTS

| | | | |
|---|---|---|---|
| 5,125,750 A * | 6/1992 | Corle et al. ................. 359/819 |
| 2002/0057645 A1* | 5/2002 | Kishima ................. 369/275.4 |
| 2003/0035361 A1* | 2/2003 | Knight et al. .......... 369/112.24 |
| 2006/0187773 A1* | 8/2006 | Ishimoto ................. 369/44.25 |

\* cited by examiner

*Primary Examiner*—Muhammad N. Edun
(74) *Attorney, Agent, or Firm*—Oblon, Spivak, McClelland, Maier & Neustadt, L.L.P.

(57) ABSTRACT

In a lens holding member for holding a solid immersion lens, when a difference-in-level portion and/or slant face is constructed at least on a part of the objective side surface, a tilt margin which can be applied to a near field optical recording and reproduction solid immersion lens can be maintained. In a focusing lens using such lens holding member, the optical pickup apparatus and the optical recording and reproducing apparatus, stable transportation between the lens and the optical recording medium can be improved.

15 Claims, 13 Drawing Sheets

FIG. 4
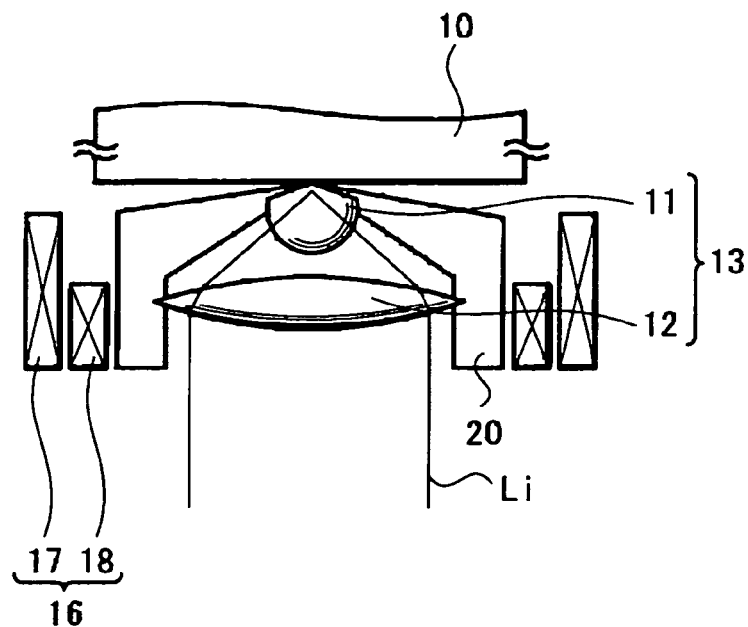
FIG. 5A
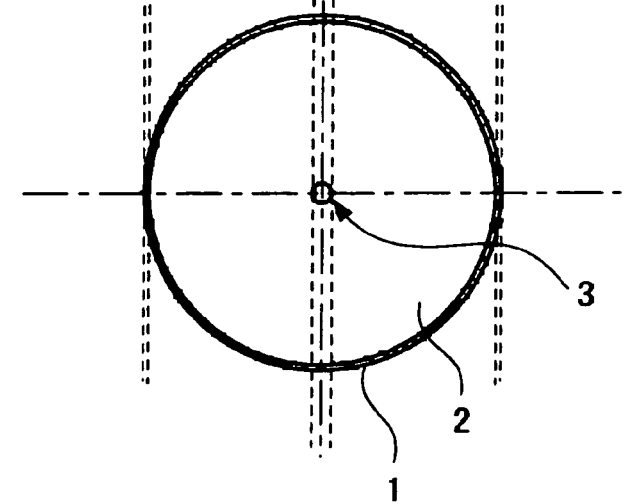
FIG. 5B

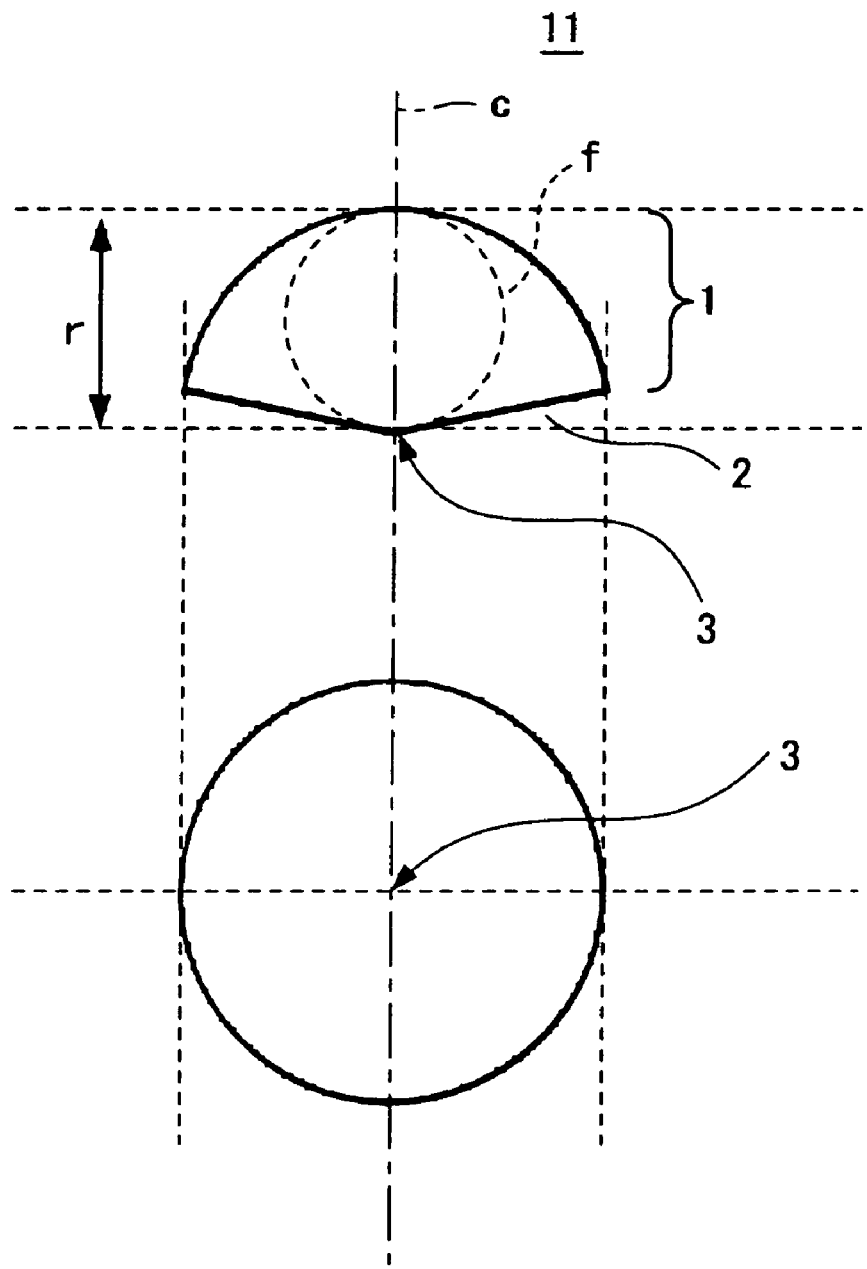

Position (μm)

LENS HOLDING MEMBER, FOCUSING LENS USING LENS HOLDING MEMBER, OPTICAL PICKUP APPARATUS AND OPTICAL RECORDING AND REPRODUCING APPARATUS

CROSS REFERENCES TO RELATED APPLICATIONS

The present invention contains subject matter related to Japanese Patent Application JP 2004-267396 filed in the Japanese Patent Office on Sep. 14, 2004, and Japanese Patent Application JP 2005-045735 filed in the Japanese Patent Office on Feb. 22, 2005, the entire contents of which being incorporated herein by reference.

BACKGROUND OF THE INVENTION

1. Field of the Invention

The present invention relates to a lens holding member suitable for use in a lens holding member of a solid immersion lens (SIL), a focusing lens using such a lens holding member, an optical pickup apparatus and an optical (or magneto-optical) recording and reproducing apparatus.

2. Description of the Related Art

Optical recording mediums (including a magneto-optical recording medium), which are represented by a compact disc (CD), a mini disc (MD) and a digital versatile disc (DVD) are widely used as storage mediums for storing therein music information, video information, data, programs and the like. However, as music information, video information, data, programs and the like are increasingly improved to become higher in tone quality, image quality, become longer in record time and play time and also become larger in storage capacity, it is desired that optical recording mediums should be increased in storage capacity and that optical recording and reproducing apparatus (including magneto-optical recording and reproducing apparatus) capable of recording and reproducing such mass-storage optical recording mediums should be realized.

Accordingly, in order to meet with the above-mentioned requirements, in the optical recording and reproducing apparatus, a wavelength of a semiconductor laser, for example, of its light source is shortened and a numerical aperture of a focusing lens is increased and thereby a diameter of a spot of light beam converged through the focusing lens is reduced.

For example, with respect to semiconductor lasers, a GaN semiconductor laser which emits laser light of which wavelength is reduced from 635 nm of related-art red laser to 400 nm band was put into practice and thereby a diameter of a spot of light beam can be reduced. Also, with respect to wavelength which can be reduced more than the above-mentioned short wavelength, for example, a far ultraviolet solid-state laser which can continuously emit laser light of a single wavelength of 266 nm is now commercially available on the market (manufactured by Sony Corporation under the trade name of UW-1020A) and hence a diameter of a spot of laser light can be reduced more. In addition, a twice wave laser (266 nm band) of an Nd:YAG laser, a diamond laser (235 nm band), a twice wave laser (202 nm band) of a GaN laser and so on are now under study and development.

A so-called near field optical recording and reproducing system has been studied in which a focusing lens with a numerical aperture greater than 1 can be realized by using an optical lens with a large numerical aperture represented by a solid immersion lens (SIL) and in which recording and reproducing can be carried out by making the objective surface of this focusing lens become close to an optical recording medium with a distance of approximately 10/1 of a wavelength of its light source (see Cited Patent Reference 1, U.S. Pat. No. 5,125,750, for example).

In this near field optical recording and reproducing system, it is important to maintain a distance between the optical recording medium and the focusing lens in the optical contact state with high accuracy. Also, since a diameter of a bundle of light introduced into the focusing lens from the light source is reduced and the distance between the optical recording medium and the focusing lens is reduced to become very small, which is less than approximately several 10s of nanometers, an inclination margin in between the optical recording medium and the focusing lens, that is, so-called tilt margin can become very small and hence it is unavoidable that the focusing lens is largely restricted from a shape standpoint.

FIG. 1 of the accompanying drawings is a schematic diagram showing an arrangement of an example of a solid immersion lens (SIL). As shown in FIG. 1, a solid immersion lens 11 and an optical lens 12 can be located, in that order, from the objective side such as an optical recording medium 10, thereby constructing a near field focusing lens. As shown in FIG. 1, the solid immersion lens 11 is formed like a hemispherical shape or a hyper-hemispherical lens (hyper-hemispherical shape in the example of FIG. 1) and a thickness extending along the optical axis thereof is selected to be $r(1+1/n)$. Although not shown, when the solid immersion lens 11 is formed like the hemispherical shape, the thickness extending along the optical axis is selected to be r.

When the focusing lens having the above-mentioned arrangement is applied to an optical recording and reproducing apparatus, for example, it is mounted on an optical pickup apparatus having a biaxial actuator and a distance between the optical recording medium and the focusing lens is maintained in an optical contact state. When the above focusing lens is applied to magneto-optical recording, a magnetic head apparatus for use in magnetic recording and reproduction is assembled into the optical pickup apparatus and a distance between the optical recording medium and the focusing lens is similarly maintained in an optical contact state.

In the above-mentioned near field optical recording and reproducing system, in order to stably control the focusing lens which is driven in the focusing direction and/or tracking direction relative to the optical recording medium and also in order to stably record and reproduce the optical recording medium, it is necessary to hold a certain amount of a tilt margin between the optical recording medium and the objective surface of the focusing lens.

Accordingly, the assignee of the present application has previously proposed a solid immersion lens, disclosed in U.S. patent application Ser. No. 11/063,608, in which a convex portion, for example, a convex portion such as a circular cone-like convex portion and a pyramid-like convex portion is formed on the objective side of the solid immersion lens and its tip end portion is processed as a planar portion to provide an objective surface so that, even when a distance between the objective surface and the optical recording medium is selected to be about several 10s of nanometers, a tilt margin of approximately ±0.1 degrees can be maintained. Thus, it is possible to provide an optical pickup apparatus and an optical recording and reproducing apparatus in which recording and reproducing characteristics can be stabilized.

However, in the solid immersion lens having the convex portion formed on the objective side as described above, a tilt margin between the surface of the objective side of the lens holding member for holding the solid immersion lens and the optical recording medium is small unavoidably.

In particular, in the tip end portion of the solid immersion lens with the convex portion, a very small convex portion is processed on a part of the lens objective surface by using a processing means such as a semiconductor processing method. Thus, even when the distance between the lens objective surface and the optical recording medium is selected to be several 10s of nanometers, although it is possible to realize the solid immersion lens shape by which a tilt margin of approximately greater than ±0.2 degrees can be maintained, since the radius of the lens holding member is as large as about several millimeters, a problem arises, in which the solid immersion lens shape is restricted by the tilt margin between the outer end portion of the lens holding member and the optical recording medium.

SUMMARY OF THE INVENTION

In view of the aforesaid aspect, the present invention intends to provide a lens holding member suitable for use with a near field optical recording and reproducing solid immersion lens in which a tilt margin can be maintained, a focusing lens using the lens holding member, an optical pickup apparatus and an optical recording and reproducing apparatus.

According to an aspect of the present invention, there is provided a lens holding member for holding a solid immersion lens in which a convex portion is formed on the objective side, the lens holding member being provided so as to open at least a light-concentrating portion provided on the convex portion of said objective side of said solid immersion lens. The lens holding member is composed of a difference-in-level portion and/or slant face formed at least on a part of the objective side surface.

According to other aspect of the present invention, there is provided a focusing lens which is composed of a solid immersion lens in which a convex portion is formed on the objective side and an optical lens with its optical axis coincident with the solid immersion lens and which is located on the opposite side of the objective side, wherein the lens holding member for holding the solid immersion lens is provided so as to open at least a light-concentrating portion provided on the convex portion of the objective side of the solid immersion lens and a difference-in-level portion and/or slant face is formed at least on a part of the objective side surface.

According to other aspect of the present invention, there is provided an optical pickup apparatus comprising a focusing lens composed of at least a solid immersion lens and an optical lens with their optical axes coincident with a light source to converge light emitted from the light source to form a beam spot, wherein a lens holding member for holding the solid immersion lens has a difference-in-level portion and/or slant face formed at least on a part of its objective side surface.

According to other aspect of the present invention, there is provided an optical recording and reproducing apparatus including an optical pickup apparatus for focusing light at the recording position of an optical recording medium to record and/or reproduce information by a focusing lens composed of a solid immersion lens having a convex portion formed on the objective side and an optical lens with its optical axis coincident with that of the solid immersion lens and which is located on the opposite side of the objective side. This optical recording and reproducing apparatus is composed of a control drive device for moving the focusing lens and the optical pickup apparatus in the focusing direction and/or tracking direction, wherein a lens holding member for holding the solid immersion lens has a difference-in-level portion and/or slant face formed at least on a part of its objective side surface.

In accordance with a further aspect of the present invention, there is provided a lens holding member for holding a solid immersion lens in which a convex portion is formed on the objective side, wherein the lens holding member is formed as a shape having a spacing between it and the solid immersion lens on the objective side at its inner side edge portion which is decreased in thickness in the light-concentrating portion of the solid immersion lens.

In accordance with yet a further aspect of the present invention, there is provided a focusing lens composed of a solid immersion lens and an optical lens with its optical axis coincident with that of the solid immersion lens and which is located on the opposite side of the objective side, wherein a lens holding member for holding the solid immersion lens has an inner side edge portion protruded toward the objective surface of the solid immersion lens, the inner side edge portion being formed as a shape having a spacing between it and the solid immersion lens on the objective side.

In accordance with yet a further aspect of the present invention, there is provided an optical pickup apparatus comprising a focusing lens composed of at least a solid immersion lens and an optical lens with their optical axes coincident with a light source to converge light emitted from the light source to form a beam spot, wherein a lens holding member for holding the solid immersion lens has an inner side edge portion protruded toward the objective surface of the solid immersion lens, the inner side edge portion being formed as a shape having a spacing between it and the solid immersion lens on the objective side.

In accordance with still a further aspect of the present invention, there is provided an optical recording and reproducing apparatus including an optical pickup apparatus for focusing light at the recording position of an optical recording medium to record and/or reproduce information by a focusing lens composed of a solid immersion lens having a convex portion formed on the objective side and an optical lens with its optical axis coincident with that of the solid immersion lens and which is located on the opposite side of the objective side. The optical recording and reproducing apparatus is composed of control drive means for moving the focusing lens and the optical pickup apparatus in the focusing direction and/or tracking direction, wherein a lens holding member for holding the solid immersion lens has an inner side edge portion protruded toward the objective surface of the solid immersion lens, the inner side edge portion being formed as a shape having a spacing between it and the solid immersion lens on the objective side.

According to the lens holding member of the present invention, since the difference-in-level portion and/or the slant face is formed on at least a part of the objective side surface, it is possible to increase the tilt margin between it and the optical recording medium.

Also, according to the lens holding member of the present invention, since the inner side edge portion which is decreased in thickness in the light-concentrating portion of the solid immersion lens is shaped so as to have a spacing between it and the solid immersion lens on the objective side, it is possible to increase the tilt margin between it and the optical recording medium.

Further, according to the focusing lens, the optical pickup apparatus and the optical recording and reproducing apparatus of the present invention, by using the above-mentioned lens holding member of the present invention, it is possible to increase the tilt margin between the focusing lens and the optical recording medium as compared with the related art.

BRIEF DESCRIPTION OF THE DRAWINGS

FIG. 4 is a diagram schematically showing an arrangement of a main portion of an example of an optical pickup apparatus according to the present invention;

FIG. 5A is a schematic side view showing an arrangement of an example of a solid immersion lens;

FIG. 5B is a schematic plan view showing an arrangement of an example of a solid immersion lens;

FIG. 6A is a schematic side view showing an arrangement of other example of a solid immersion lens;

FIG. 6B is a schematic plan view showing an arrangement of other example of a solid immersion lens;

DESCRIPTION OF THE PREFERRED EMBODIMENTS

While the embodiments of the present invention will be described below reference to the drawings, it is needless to say that the present invention is not limited to the following embodiments.

The present invention can be applied to a lens holding member suitable for use with a solid immersion lens, a focusing lens consisting of the lens holding member and an optical lens with an optical axis thereof being coincident with that of the solid immersion lens and which is located on the opposite side of the objective side, an optical pickup apparatus including this focusing lens and which uses a so-called near field optical recording and reproducing system and an optical recording and reproducing apparatus including this optical pickup apparatus.

Figure 1:
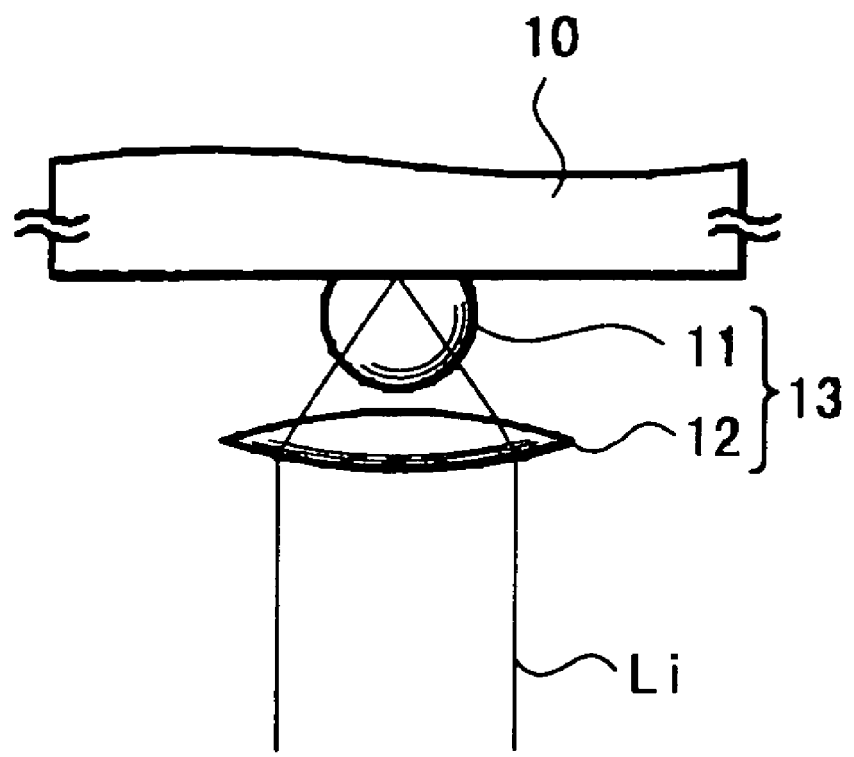
FIG. 1 is a diagram schematically showing an arrangement of an example of a solid immersion lens (SIL) according to the related art.
Figure 2:
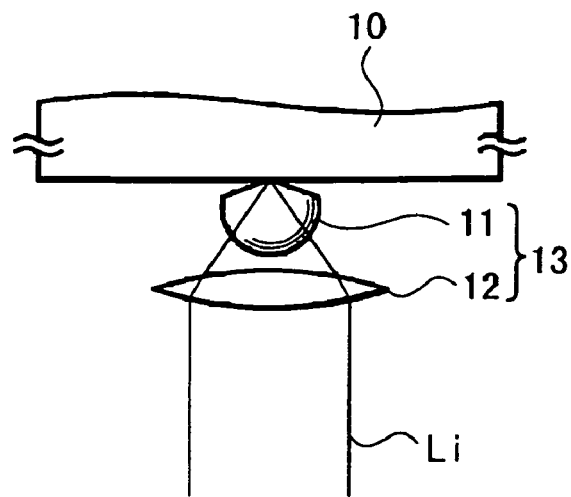
FIG. 2 is a diagram schematically showing an arrangement of an example of a focusing lens according to the present invention.
Figure 3:
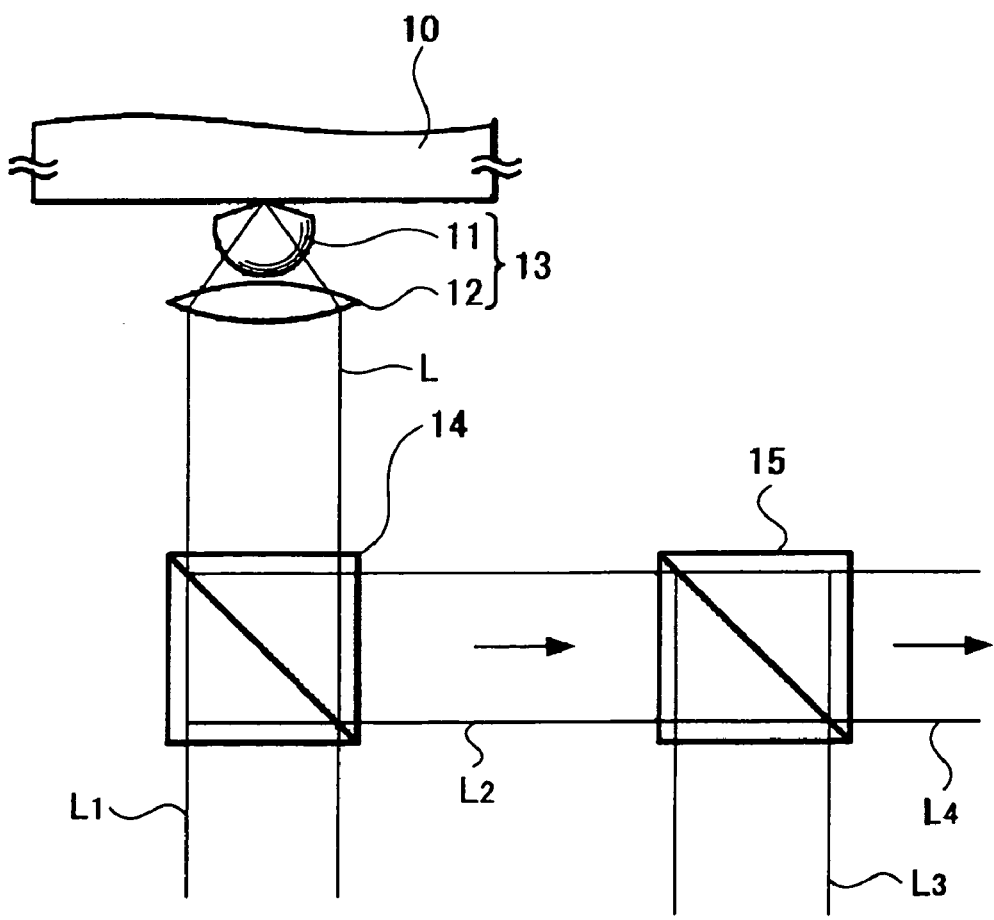
FIG. 3 is a diagram schematically showing an arrangement a main portion of an example of an optical pickup apparatus according to the present invention.

Prior to description of the lens holding member according to the present invention, the embodiment in which the present invention is applied to an optical pickup apparatus and an optical recording and reproducing apparatus will be described with reference to FIGS. 2 to 4. In FIGS. 2 to 4, a shape of a solid immersion lens is such one provided by simplifying an example of an arrangement according to the present invention in order to facilitate explanation of the layout and arrangement of the solid immersion lens. It is needless to say that the shape of this solid immersion lens can take shapes of arrangements of the present invention including examples of FIGS. 5A and 5B and the following drawings.

FIG. 2 is a schematic diagram of an arrangement showing an example of a focusing lens according to the present invention. As shown in FIG. 2, the solid immersion lens 11 according to the arrangement of the present invention and the optical lens 12 are located, in that order, in an opposing relation to the lens object, for example, the optical recording medium 10 in such a manner that their optical axes may become coincident with each other. The solid immersion lens 11 is formed like a hemispherical shape or hyper-hemispherical shape with a radius of curvature r. A thickness thereof extending along its optical axis is selected to be r when the solid immersion lens is formed as the hemispherical shape. When the solid immersion lens 11 is formed like the hyper-hemispherical shape as in the illustrated example, if a refractive index is selected to be n, a thickness thereof extending along its optical axis is selected to be r (1+1/n). According to this arrangement, it is possible to provide a focusing lens 13 with a high numerical aperture exceeding the numerical aperture NA of the optical lens 12.

While the solid immersion lens 11 and the optical recording medium 12 are not brought in contact with each other in actual practice, a space between the solid immersion lens 11 and the optical recording medium 10 is sufficiently small as compared with the thickness of the solid immersion lens 11 so that such small space is not shown in FIGS. 2 to 4. A distance between the solid immersion lens 11 and the optical recording medium 10 is shorter than a wavelength of laser light emitted from a light source. To be concrete, when a wavelength of laser light is 405 nm, a distance between the solid immersion lens 11 and the optical recording medium 10 is placed in the state in which they may become very close to each other as in the distance of 85 nm or 25 nm.

FIG. 3 is a schematic diagram of an arrangement showing an example of an arrangement of an optical system of an optical pickup apparatus using the solid immersion lens and the focusing lens. First and second beam splitters 14 and 15, for example, are located between a light source and a photodetector, although not shown, and the focusing lens 13 composed of the solid immersion lens 11 and the optical lens 12. The optical recording medium 10 is mounted on a spindle motor (not shown) and rotated at a predetermined revolution rate if it is shaped like a disc, for example.

Also, the optical pickup apparatus shown in FIGS. 2 and 3 is provided with means for driving the focusing lens 13 in the tracking direction and the focusing direction.

As these means, there may be numerated a biaxial actuator for use with a general optical pickup, a slider for use with a magnetic head apparatus and the like.

Examples of these control drive means for use with the focusing lens 13 will be described next.

FIG. 4 is a schematic diagram of an arrangement showing an example of an optical pickup apparatus constructing a part of the optical recording and reproducing apparatus according to the present invention, that is, an example of an optical pickup apparatus using a biaxial actuator as the control drive means. As shown in FIG. 4, the focusing lens 13 is fixed by a holding member 20 such that optical axes of the solid immersion lens 11 and the optical lens may become coincident with each other. This holding member 20 is fixed to a biaxial actuator 16 which can be driven in the focusing direction and/or tracking direction.

As shown in FIG. 4, the biaxial actuator 16 is composed of a tracking coil 17 for driving the focusing lens 13 in the tracking direction and a focusing coil 18 for driving the focusing lens 16 in the focusing direction.

Then, this biaxial actuator 16 is able to control the distance between the optical recording medium 10 and the solid immersion lens 11 by monitoring a quantity of returned light, for example, so that resultant distance information may be fed back. As a result, a distance between the solid immersion lens 11 and the optical recording medium 10 can be kept substantially constant, and also the solid immersion lens 11 and the optical recording medium can be prevented from colliding with each other.

Also, this biaxial actuator 1 is able to move a focused beam spot to a desired recording track by monitoring a quantity of returned light in the tracking direction so that resultant position information may be fed back.

Referring back to FIG. 3, the schematic arrangement of the optical pickup apparatus will be described below. As shown in FIG. 3, outward light emitted from a light source, for example, a semiconductor laser is collimated to parallel light (L1) by a collimator lens (not shown), passed through the first beam splitter 14 (L) and converged on the information recording surface of the optical recording medium 10 by the focusing lens 13. Inward light reflected on the information recording surface is passed through the focusing lens 13, reflected by the first beam splitter 14 (L2) and thereby introduced into the second beam splitter 15. Then, inward lights (L3 and L4) separated by this second beam splitter 15 are focused on a focusing photodetector (not shown) and a signal photodetector (not shown) and thereby a focusing error signal, a reproduced pit signal and the like are detected.

Also, inward light reflected by the second beam splitter 15 is focused on the tracking photodetector, for example, and thereby a tracking error signal is detected. If necessary, in this optical pickup apparatus, in order to remove disc rotation fluctuations from the optical recording medium 10, a relay lens (not shown) capable of correcting a focusing error component which the biaxial actuator 16 to which the focusing lens 13 is fixed may not fully follow and an error component generated upon assembly process of the focusing lens by changing a space between two lenses may be inserted between the first beam splitter 14 and the optical lens 12.

Although not shown, when a focusing lens is mounted on a slider, as the means for correcting the remaining focus error component followed by the slider and the error component produced upon assembly process of the focusing lens, the focusing lens may be fixed to the slider and the optical lens may be moved in the optical axis direction by a suitable means such as a piezoelectric element.

Also, in the case of an optical recording and reproducing apparatus in which a spindle motor includes a means to which a plurality of optical recording mediums is mounted, it is suitable that the slider may include a mirror for bending optical axis substantially 90 degrees. Since the optical recording and reproducing apparatus having the above-mentioned arrangement can decrease a space between optical recording mediums, it is thus possible to make the apparatus become small in size and become thin in thickness.

The above-described optical pickup apparatus may contain a reproducing optical pickup apparatus designed exclusively only for reproducing information, a recording optical pickup apparatus designed exclusively only for recording information and a recording and reproducing optical pickup apparatus designed for recording and reproducing information. The above-mentioned respective optical pickup apparatus may be modified such that a magnetic coil and the like may be assembled into a part of the optical pickup apparatus. This relationship will apply for a thermomagnetic recording and reproducing system as well. Also, the optical recording and reproducing apparatus may contain a reproducing apparatus designed exclusively for only reproducing information, a recording apparatus designed exclusively for only recording information and a recording and reproducing apparatus capable of recording and reproducing information.

Next, examples of lens shapes which can be suitably applied to a solid immersion lens for use with the lens holding member according to the present invention will be described.

An example of a solid immersion lens which can be applied to the present invention will be described with reference to a schematic side view and a schematic plan view of FIGS. 5A and 5B. In this example, the spherical portion 1 is shaped like a hyper-hemispherical portion, and there is provided the solid immersion lens 11 in which a radius of curvature is assumed to be r, a refractive index is assumed to be n and a thickness in the direction extending along an optical axis c is assumed to be $r(1+1/n)$. The convex portion 2 which protrudes toward the optical recording medium is provided on the objective side.

In FIGS. 5A and 5B, a broken line R denotes a cross-section in which a radius becomes r in the cross-section which is perpendicular to the optical axis of the solid immersion lens 11.

In this solid immersion lens 11, the convex portion 2 may be shaped like a circular cone portion or a pyramidal portion.

In addition, as shown in FIGS. 6A and 6B, the spherical portion 1 may be shaped like a hemispherical portion of which radius of curvature is selected to be r, the thickness extending along its optical axis being selected to be r and the convex portion 2 being shaped like substantially a circular cone portion or pyramidal portion similarly. In this case, the objective surface 3 at the tip end portion may be formed as a shape which substantially circumscribes a sphere, shown by a broken line f, with a radius thereof being substantially r/2. In this case, there is an advantage in which even when an optical axis of incident light such as laser light is slightly inclined from the optical axis of the lens 11, a distance in which incident light passes the solid immersion lens 11 can be prevented from being changed so that the incident light can be concentrated on the objective surface satisfactorily.

In FIGS. 6A and 6B, elements and parts identical to those of FIGS. 5A and 5B are denoted by identical reference numerals and therefore need not be described.

Figure 7A:
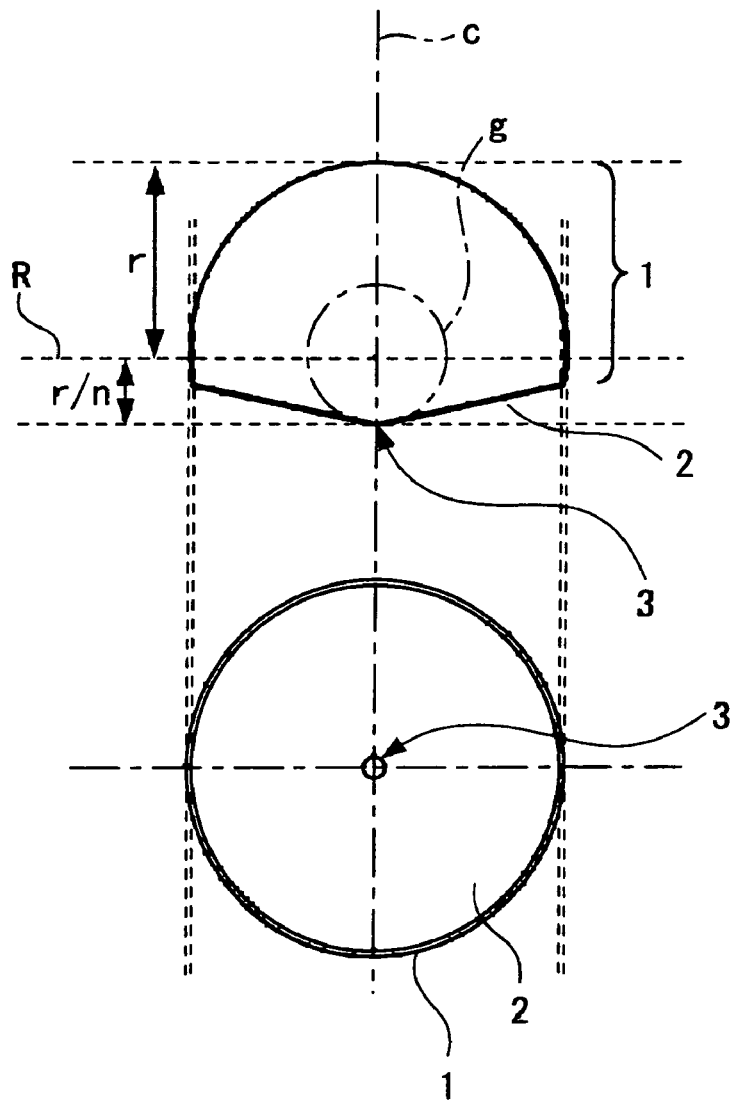
FIG. 7A is a schematic side view showing an arrangement of a further example of a solid immersion lens.
Figure 7B:
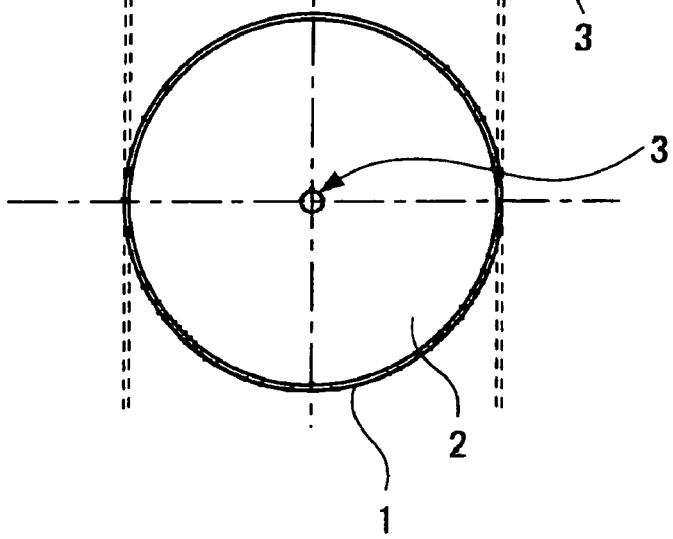
FIG. 7B is a schematic plan view showing an arrangement of a further example of a solid immersion lens.

Also, as shown in FIGS. 7A and 7B, the spherical portion 1 may be formed as a hyper-hemispherical portion, the convex portion 2 may be formed as substantially a circular cone shape or a pyramidal shape and the objective surface 3 at the tip end portion may be formed as a shape which substantially circumscribes a sphere, shown by a dot-and-dash line g, of which radius, for example, is nearly r/n. Also in this case, similarly to the example shown in FIGS. 6A and 6B, there is an advantage in which, even when an optical axis of incident light such as laser light is slightly inclined from the optical axis of the lens 11, a distance in which incident light passes the solid immersion lens 11 can be prevented from being changed so that the incident light can be concentrated on the objective surface satisfactorily.

In FIGS. 7A and 7B, elements and parts identical to those of FIGS. 5A and 5B and FIGS. 6A and 6B are denoted by identical reference numerals and therefore need not be described.

Figure 8A:
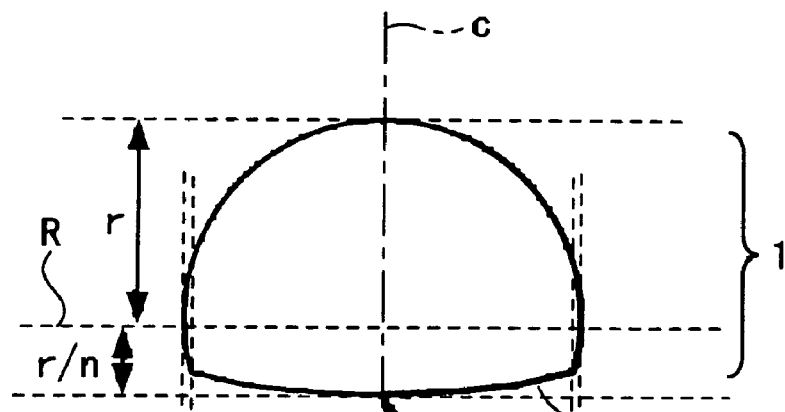
FIG. 8A is a schematic side view showing an arrangement of yet a further example of a solid immersion lens.
Figure 8B:
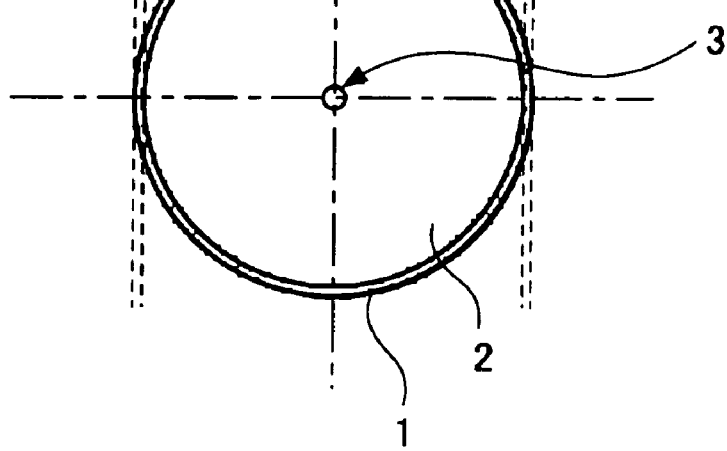
FIG. 8B is a schematic plan view showing an arrangement of yet a further example of a solid immersion lens.

Further, as shown in FIGS. 8A and 8B, the convex portion 2 may be formed as various kinds of curved surfaces containing a spherical surface, for example.

In FIGS. 8A and 8B, elements and parts identical to those of FIGS. 5A and 5B are denoted by identical reference numerals and therefore need not be described.

The inclination angle of the convex portion 2 is set to be larger than an angle of incidence so as not to disturb incident light from a laser. When a lens material of which refractive index lies in a range of from approximately 2 to 3 is in use, its angle fall within a range of from substantially 10 to 30 degrees from the objective surface 3.

Also, since a near field optical recording and reproducing system relative to the optical recording medium requires a magnetic field upon recording and/or reproduction, it is possible to attach a suitable device such as a magnetic coil on a part of or around the objective surface 3 of the solid immersion lens.

As a material of such solid immersion lens, a material having a large refractive index, a large transmittance and a small photoabsorption relative to a wavelength of a laser light source of the optical recording and reproducing apparatus and the optical pickup apparatus may be suitably used as mentioned above. For example, S-LAH79 (trade name), manufactured by OHARA INC., which is a high refractive index glass, $Bi_4Ge_3O_{12}$, $SrTiO_3$, $ZrO_2$, $HfO_2$, SiC, $KTaO_3$, diamond which are high refractive index ceramics and high refractive index single crystal materials may be suitable materials.

Also, it is desirable that these lens materials should have amorphous structure or that they should have cubic structure if they are single crystal materials. If the lens material ahs the amorphous structure or the cubic structure, then since an etch rate and an etch characteristic are not changed by the crystal azimuth, an etching method and an etching system for use in processing well-known semiconductors are available.

Further, when the light-concentrating portion provided at the tip end of the convex portion such as the circular cone portion of the solid immersion lens, that is, the flat portion of the objective surface is processed, an etching method and an etching system utilized in well-known semiconductor processing are available. In particular, when a very small tip end portion is processed, it is suitable to use a focus ion beam processing method and a focus ion beam processing system such as a focus ion beam processing inspection system FB-2100 (trade name) made by HITACHI LTD., for example.

Figure 9:
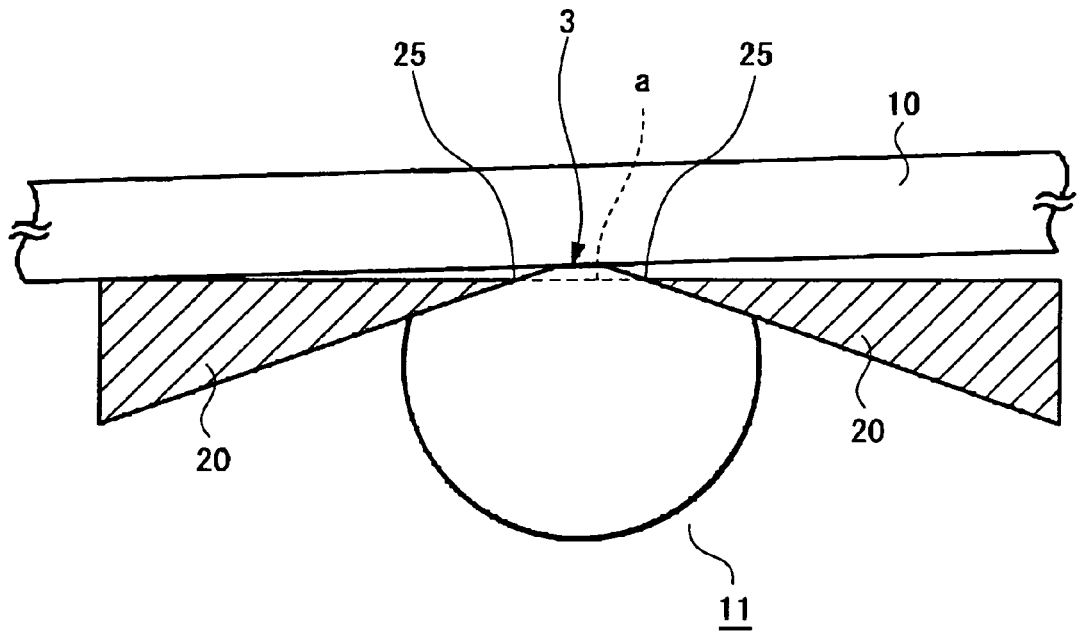
FIG. 9 is a diagram schematically showing an arrangement of an example of a lens holding member according to a comparative example.
Figure 10:
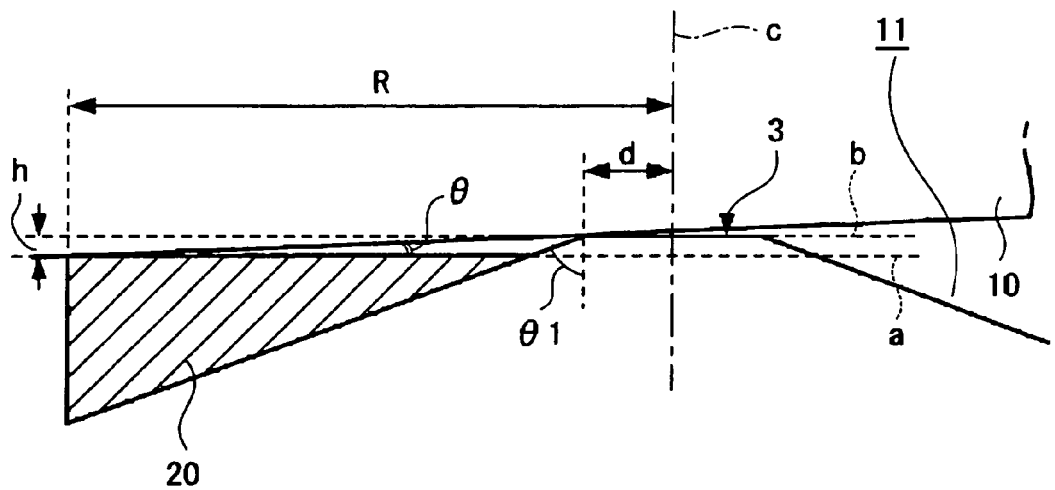
FIG. 10 is a diagram schematically showing an arrangement of an example of a lens holding member according to a comparative example.

FIGS. 9 and 10 show a schematic arrangement of a lens holding member 20 obtained when the lens holding member 20 is formed as the flat surface at its surface of the objective side opposing the optical recording medium as a comparative example, and a tilt margin relative to the optical recording medium will be described. In FIG. 9, a convex portion such as a circular cone-like portion is provided on the solid immersion lens 11 at its objective side opposing the optical recording medium 10. A lens holding member 20 includes an inner side edge portion 25 of a doughnut-like circular-hole type, for example, surrounding the objective surface 3 which is the light-concentrating portion at the tip end of this convex portion so as to open the objective surface 3, and the cross-sectional shape extending along the optical axis of the solid immersion lens 11 is formed as a triangular shape or a curved shape which is thinned in the light-concentrating portion of the solid immersion lens 11, that is, the objective surface 3 and in which its inner side edge portion 25 is formed as an acute-angle apex angle. Then, the solid immersion lens 20 is bonded to the inside of the lens holding member 20 at its contact surface with the solid immersion lens 11 by using an adhesive such as an ultraviolet-curing resin and a thermosetting resin.

As earlier described with reference to FIG. 4, for example, this lens holding member 20 may be shaped in such a manner that the optical lens located on the opposite side of the solid immersion lens 11 opposing the optical recording medium may be held at an outer elongated portion, not shown, so that its optical axis may substantially coincide with the solid immersion lens 11. In FIG. 9, a broken line a shows a cross-section extending along the lens holding member 20 at its surface opposing the optical recording medium 10.

While FIG. 9 shows the state in which the surface of the optical recording medium 10 is inclined from the optical axis of the solid immersion lens 11, a tilt margin produced at that time will be described with reference to FIG. 10.

As shown in FIG. 10, an inclination angle of the convex portion of the solid immersion lens 11 is assumed to be θ1 and the radius of the objective surface 3 is assumed to be d. An allowable inclination angle between the lens holding member 20 and the optical recording medium 10 is expressed by the following equation (1):

$$\tan \theta = h/(R-d) \qquad (1)$$

where h represents the spacing between the surface of the lens holding member 20 opposing the optical recording medium 10 and the flat surface, shown by a broken line b, extending along the objective surface 3 of the solid immersion lens 11, R represents the distance from the optical axis c to the outer end edge of the lens holding member 20.

While the spacing h between the objective surface 3 and the surface of the lens holding member 20, that is, the height difference between the lens holding member 20 and the objective surface 3 is designed to be optimum depending on the inclination angle θ1 of the convex portion of the solid immersion lens 11, it is affected by the bonding state of the adhesive used between the lens holding member 20 and the solid immersion lens 11. For example, the inclination angle θ1 of the convex portion is selected to be in a range of from approximately 60 to 80 degrees and the height difference h between the lens holding member 20 and the objective surface 3 is selected to be in a range of from several 10s of micrometers to several 100s of micrometers.

Also, the radius d of the objective surface 3 of the solid immersion lens 11 is selected to be in a range of from several micrometers to several 10s of micrometers.

The shape and size (radius d) of the objective surface 3 may be processed as a very small convex shape or curved surface shape, for example, so that the tilt margin relative to the optical recording medium 10 may be maximized in this portion.

Next, superiority of the tilt margin of the lens holding member according to the present invention will be described with reference to specific inventive examples and comparative examples of the lens holding member according to the present invention.

In the following examples, as the material of the solid immersion lens, there can be used a high refractive index glass material manufactured by OHARA INC., under the trade name of S-LAH79. When the radius r of the solid immersion lens is selected to be 0.45 mm and the spherical portion is formed as a hyper-spherical portion, its thickness r (1+1/n) becomes 0.667 mm.

FIGS. 11A and 11B and FIGS. 12A and 12B show enlarged photographs of the solid immersion lenses and the surfaces of the objective sides of the lens holding members in the respective examples in which the surfaces of the objective sides of the lens holding members are formed as flat surfaces and measured results of the surface height differences as comparative examples 1 and 2, respectively.

Figure 11A:
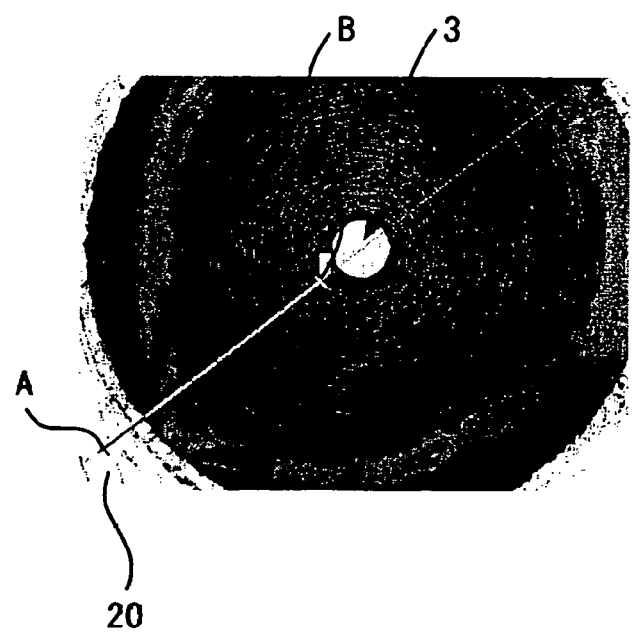
FIG. 11A is a microscopic representation showing in an enlarged-scale a difference between high and low portions formed on the surface of an objective side of an example of a lens holding member.
Figure 11B:
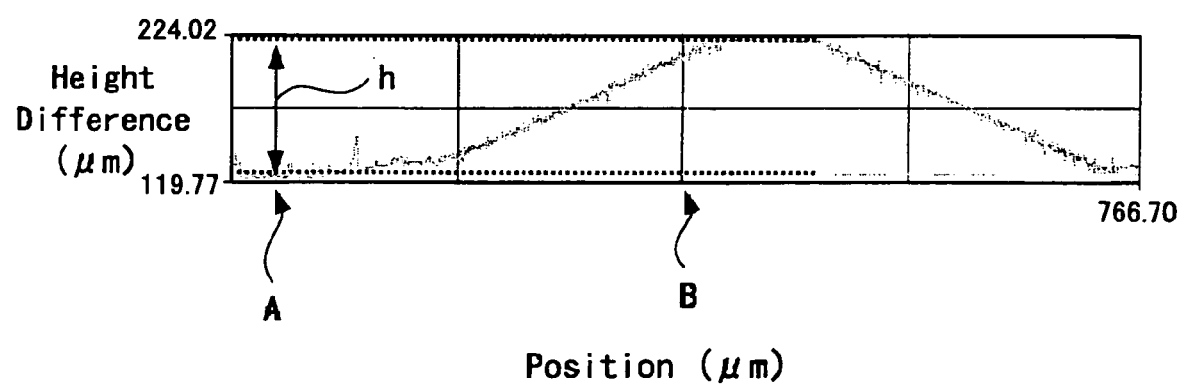
FIG. 11B is a diagram showing results obtained when a difference between high and low portions was measured.

In FIGS. 11A and 11B, the comparative example 1 is the example in which the convex portion of the objective side of the solid immersion lens 11 is formed as a circular cone shape with an inclination angle of 70 degrees, the numerical aperture NA being selected to be 1.84. Also, the distance R between the outer edge end of the lens holding member 20 and the optical axis is selected to be 1950 μm and the radius d of the objective surface 3 is selected to be 20 μm. FIG. 11B shows results obtained when the surface height between the positions A and B in FIG. 11A was measured.

As is clear from FIG. 11B, a height difference between the objective surface 3 of the solid immersion lens 11 and the surface of the objective side of the lens holding member 20 was approximately 90 μm.

Accordingly, in this case, the tilt margin θ between the optical recording medium 10 and the lens holding member 20 is calculated as:

$$\tan^{-1}(h/R-d) = \tan^{-1}(90/(1950-20))$$
$$= 2.67$$

Thus, it is to be understood that the tilt margin becomes less than 3 degrees.

Figure 12A:
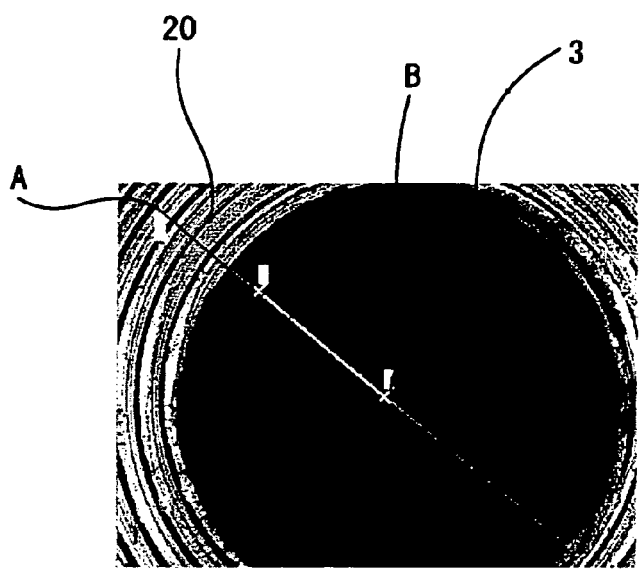
FIG. 12A is a microscopic representation showing in an enlarged-scale a difference between high and low portions formed on the surface of an objective side of another example of a lens holding member.
Figure 12B:
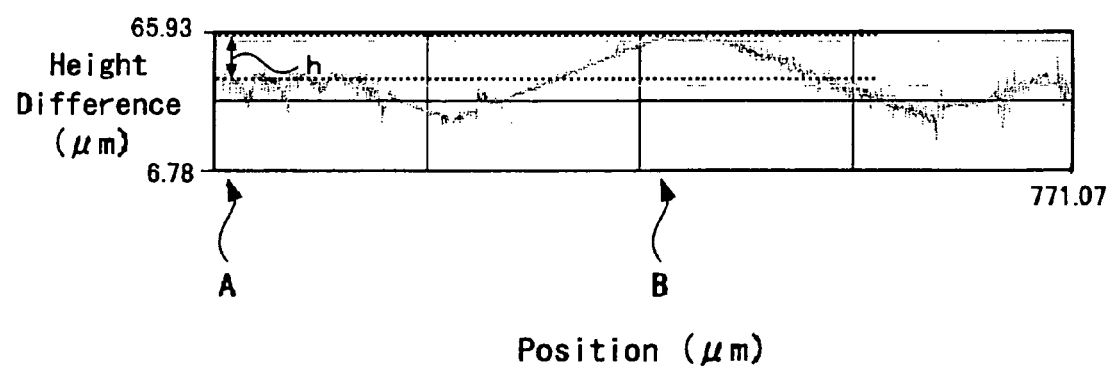
FIG. 12B is a diagram showing results obtained when a difference between high and low portions was measured.

Further, as the comparative example 2, FIG. 12A shows an enlarged photograph of the surface of the objective side with respect to the case in which the convex portion of the objective side of the solid immersion lens 11 is formed as a circular cone shape with an inclination angle of 80 degrees, with the numerical aperture being further increased to be 1.99. Also, FIG. 12B shows results obtained when the surface height between the position A and B in FIG. 12A was measured. From this measured result, it is to be understood that the height difference h between the lens holding member 20 and the objective surface 3 was 20 μm.

Accordingly, in this comparative example 2, the tilt margin θ between the optical recording medium 10 and the lens holding member 20 is calculated as:

$$\tan^{-1}(h/R-d) = \tan^{-1}(20/(1950-20))$$
$$= 0.59$$

Thus, it is to be understood that only the tilt margin of less than 0.6 degrees was obtained.

Figure 13:
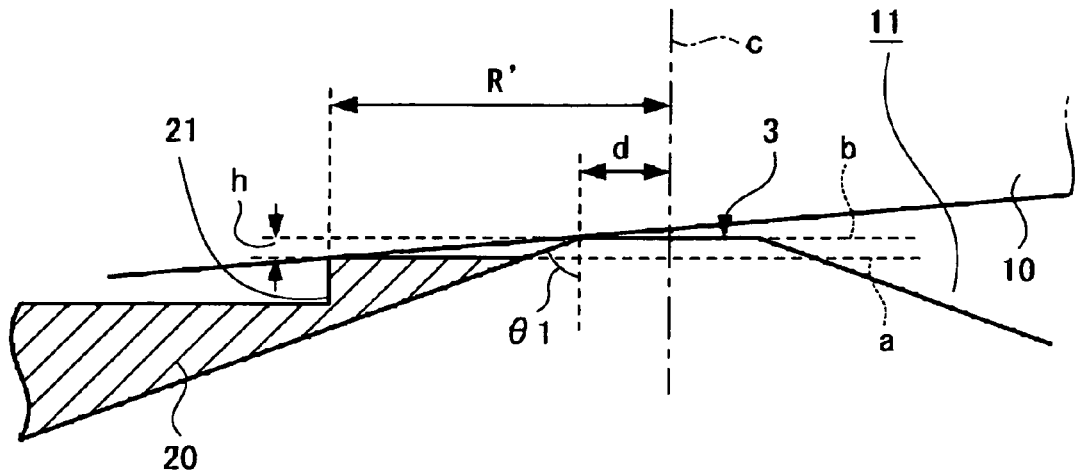
FIG. 13 is a diagram schematically showing an arrangement of a main portion of an example of a lens holding member according to the present invention.

Accordingly, in the present invention, as FIG. 13 shows a schematic arrangement of an example, a difference-in-level portion and/or slant face, in the illustrated example, a difference-in-level portion 21 is provided at least on a part of the surface of the objective side of the lens holding member 20.

For example, as an inventive example 1, let us explain a tilt margin obtained when one step of this difference-in-level portion 21 is provided on a part of the surface of the objective side of the lens holding member 20. In this inventive example 1, the convex portion of the objective surface 3 of the solid immersion lens 11 was manufactured with an inclination angle of 70 degrees. Also, the radius d of the objective surface 3 was selected to be 20 μm and as shown in FIG. 13, a distance R' between the objective surface 3 of the lens holding member 20 of the solid immersion lens 11 and the edge portion of the difference-in-level portion 21 was selected to be 1 mm. At that time, the height difference h between the objective surface 3 of the solid immersion lens 11 and the surface of the objective side of the lens holding member 20 was 90 μm, and the tilt margin θ of the lens holding member 20 relative to the optical recording medium 10 was 5.25 degrees.

Accordingly, it is to be understood that the tilt margin can be increased approximately 2.6 degrees as compared with the comparative example 1 by providing the difference-in-level portion 21 as described above.

Next, as an inventive example 2, there was manufactured a product in which the convex portion of the solid immersion lens 11 was formed with an inclination angle of 80 degrees, other shape being made similar to that of the above-mentioned inventive example 1. At that time, the height difference h between the objective surface 3 of the solid immersion lens 11 and the surface of the objective side of the lens holding member 20 was 20 μm and the tilt margin of the lens holding member 20 relative to the optical recording medium 10 was 1.17 degrees.

Accordingly, it is to be understood that the tilt margin could be increased 0.58 degrees as compared with the comparative example 2.

Figure 14:
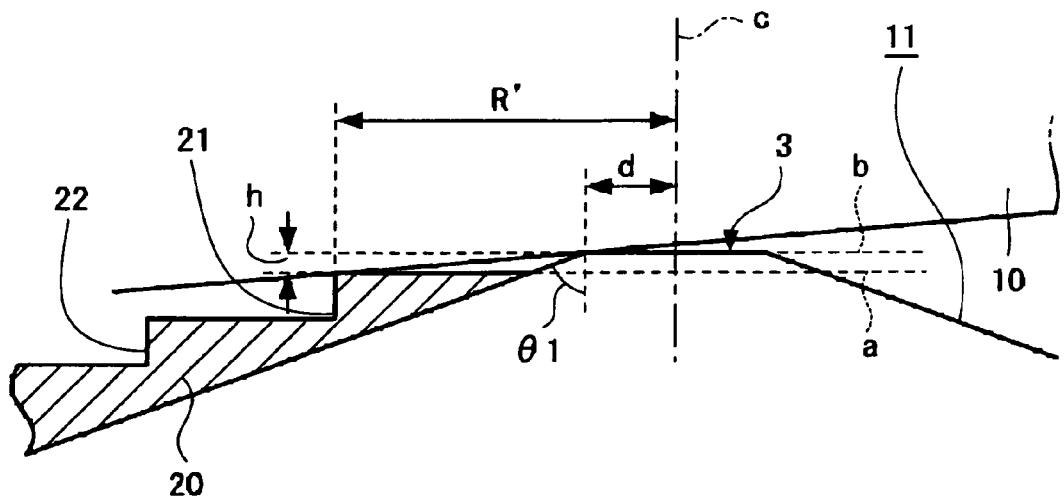
FIG. 14 is a diagram schematically showing an arrangement of a main portion of other example of a lens holding member according to the present invention.

Further, as FIG. 14 shows a schematic arrangement of an example, difference-in-level portions of more than two steps, in the illustrated example, difference-in-level portions 21 and 22 may be provided. Also in this case, by properly selecting the distance R' from the optical axis c to the edge portion of the difference-in-level portion 21 of the side of the objective surface 3 and the height difference h, further, a height difference between the difference-in-level portions 21 and 22, a distance from the optical axis to the edge portion of the difference-in-level portion 22 and the like, it is possible to increase the tilt margin relative to the optical recording medium 10 similarly. Also, it is possible to increase a tilt margin more by providing more than two difference-in-level portions. In FIG. 14, elements and parts identical to those of FIG. 13 are denoted by identical reference numerals and therefore need not be described.

Figure 15:
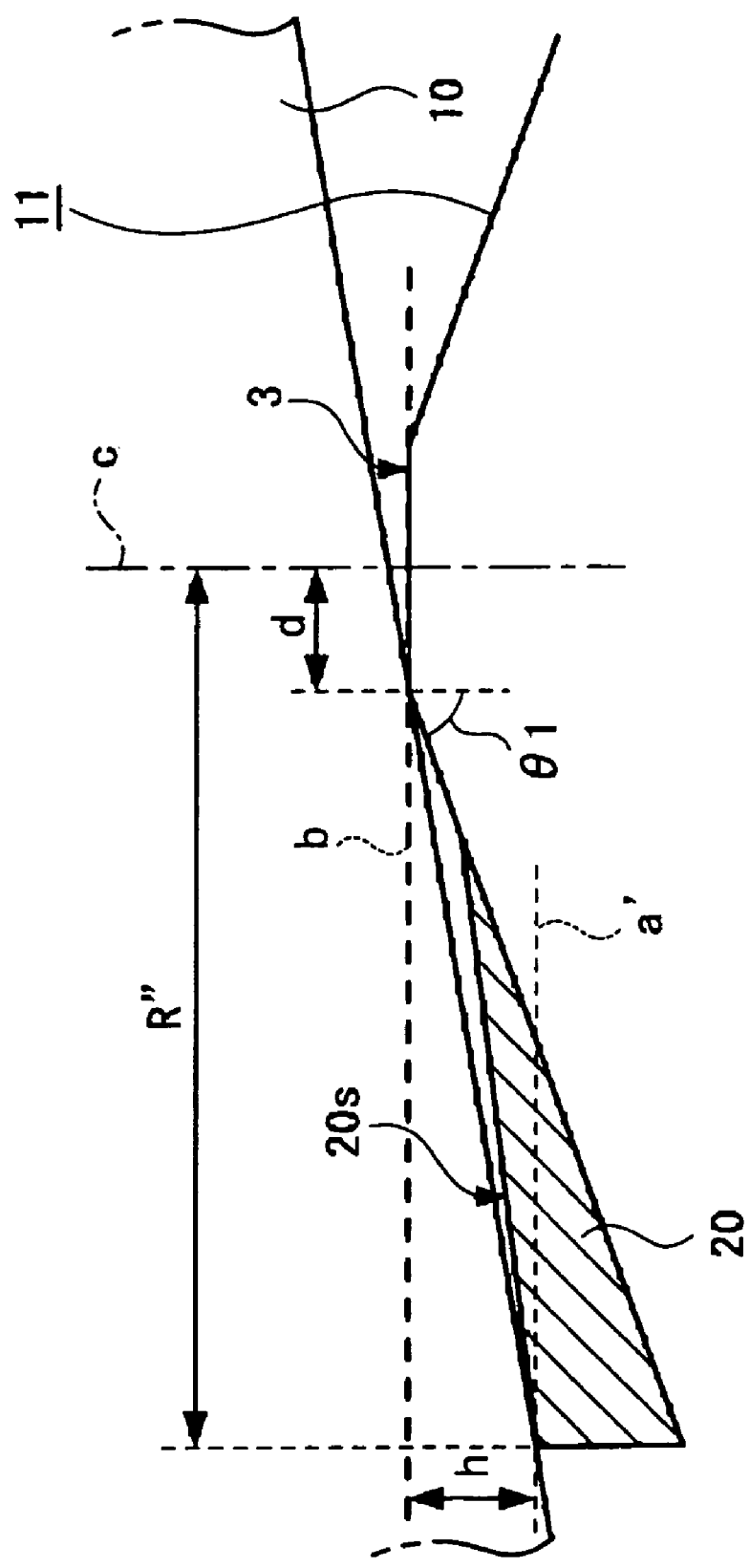
FIG. 15 is a diagram schematically showing an arrangement of a main portion of a further example of a lens holding member according to the present invention.

Also, as shown in FIG. 15, an slant face 20S may be provided on the surface of the objective side of the lens holding member 20 so as to be spaced apart from the optical recording medium 10 toward the outside edge portion. Also in this case, it is possible to increase the tilt margin between the optical recording medium 10 and the lens holding member 20 similarly. Specifically, as is clear from FIG. 15, in this case, it is possible to increase the height difference h (spacing between broken lines a' and b in FIG. 15) between the objective surface 3 and the outer end edge of the lens holding member 20 easily by providing the slant face 20S. Thus, it is to be understood that the tilt margin could be increased. In FIG. 15, elements and parts identical to those of FIG. 13 are denoted by identical reference numerals and therefore need not be described.

Also, by providing more than two slant faces, it is possible to increase the tilt margin more.

An inventive example 3 was manufactured in which the convex portion of the solid immersion lens 11 was formed with an inclination angle of 70 degrees, the shape of the solid immersion lens 11 being made similar to that of the inventive example 1. As shown in FIG. 15, the surface of the objective side of the lens holding member 20 relative to the optical recording medium 10 was formed as the slant face 20S and the tilt margin was measured. The height difference between the edge portion of the lens holding member 20 and the objective surface 3 of the solid immersion lens 11 was 340 μm and the tilt margin between the optical recording medium 10 and the lens holding member 20 was 10.0 degrees.

As described above, by providing the slant face 20S on the surface of the objective side of the lens holding member 20 relative to the optical recording medium 10, it was possible to increase the tilt margin 7.33 degrees as compared with the comparative example 1.

Also, an inventive example 4 was manufactured in which the convex portion of the solid immersion lens 11 was formed as a circular cone portion with an inclination angle of 80 degrees, the shape of the solid immersion lens 11 being made similar to that of the above-mentioned inventive example 3. At that time, the height difference between the edge portion of the lens holding member 20 and the objective surface 3 of the solid immersion lens 11 was 170 μm and the tilt margin between the optical recording medium 10 and the lens holding member 20 was 5.0 degrees.

Accordingly, it is to be understood that the tilt margin could be increased 4.41 degrees as compared with the comparative example 2 by providing the slant face 20S on the surface of the objective side of the lens holding member 20 as described above.

While the difference-in-level portion or the slant face is provided on the objective side surface of the lens holding member 20 in the above-described respective examples, the present invention is not limited thereto and such a variant is also possible. That is, it is clear that the tilt margin can be increased more by providing the difference-in-level portion and by forming the objective side surface as the slant face.

Then, even when any shape is in use, it is desirable that the length of the flat surface portion or the slant face of the difference-in-level portion, the height difference between the difference-in-level portions, the distance between the edge portion of the difference-in-level portion or the slant face and the optical axis, the height difference relative to the objective surface and the like should be selected so that the tilt margin may be increased most relative to the skew of the optical recording medium.

While the adhesive between the lens holding member 20 and the solid immersion lens 11 is not shown in FIGS. 13 to 15, since the adhesive such as the ultraviolet-curing resin is interposed between the lens holding member 20 and the solid immersion lens 11 in actual practice, a problem in which the adhesive is unnecessarily protruded into the objective side surface becomes more serious as the diameter of the solid immersion lens 11 is decreased and as the numerical aperture NA is increased.

Figure 16:
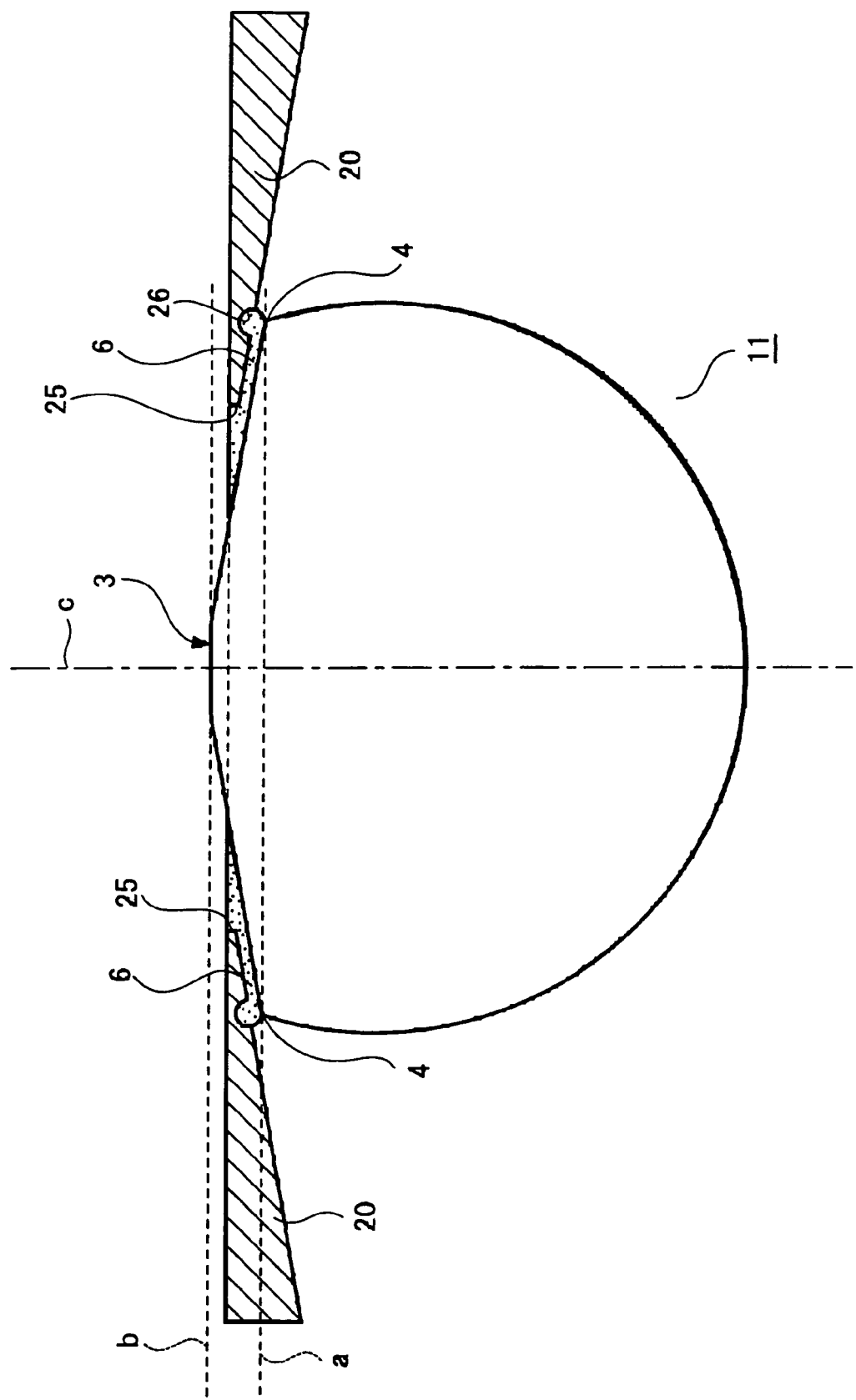
FIG. 16 is a diagram schematically showing an arrangement of a main portion of yet a further example of a lens holding member according to the present invention.

To solve this problem, according to the present invention, as shown in FIG. 16, the inner side edge portion 25 which holds the solid immersion lens 11 of the lens holding member 20 is shaped so as to have a clearance between it and the solid immersion lens 11 at its objective side. If the inner peripheral edge of the lens holding member 20 is formed as the vertical surface substantially extending along the optical axis c so that a clearance of a certain size is produced between the vertical surface and the inclined surface and curved surface of the convex portion of the solid immersion lens 11 as described above, then as FIG. 17, for example, shows a schematic arrangement, it is possible to avoid the occurrence of a so-called adhesive reservoir 6B in which the adhesive 6 is protruded into the objective side at this portion. Hence, it is possible to avoid the tilt margin from being affected by the occurrence of the adhesive reservoir 6B.

Figure 17:
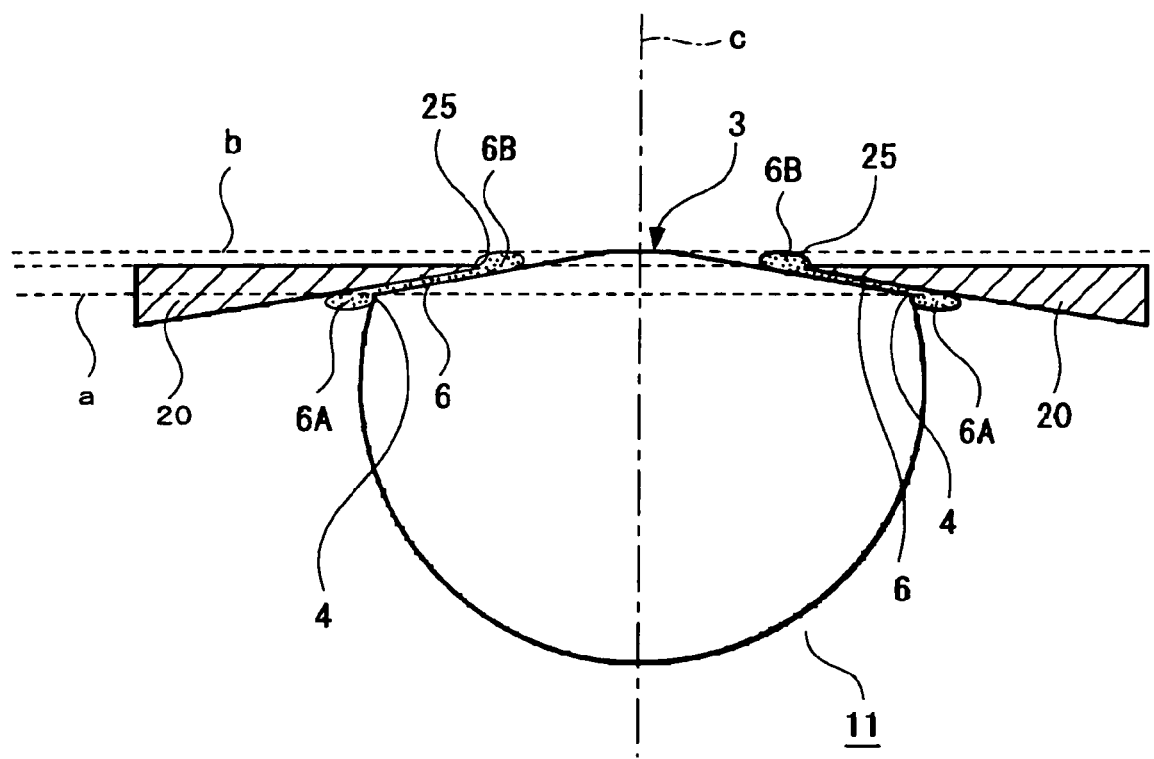
FIG. 17 is a diagram schematically showing an arrangement of a main portion of a lens holding member according to a comparative example.

Further, as shown in FIG. 16, when the concave portion 26 is provided at the position substantially opposing at least the peripheral edge portion 4 of the solid immersion lens 11 at the inner side surface contacting with the solid immersion lens 11 of the lens holding member 20, the adhesive 6 can be suppressed from being protruded into the peripheral edge portion of the solid immersion lens 11 at this portion and hence it is possible to avoid influence from being imposed on incident light at the portion near the peripheral edge portion 4 of the solid immersion lens 11, that is, interference can be avoided from being imposed on incident light due to the adhesive reservoir 6B produced in the peripheral edge portion as shown in FIG. 17.

In FIG. 17, elements and parts identical to those of FIG. 16 are denoted by identical reference numerals and therefore need not be described.

As described above, if the lens holding member of the present invention is used, even when the inclination angle of the convex portion o the objective side of the solid immersion lens is increased in order to increase the tilt margin relative to the optical recording medium, it is possible to maintain a sufficiently large tilt margin. Accordingly, the focusing lens with the large numerical aperture by which the optical recording medium can be rotated stably as compared with the related art can be obtained. Hence, in the optical pickup apparatus and the optical recording and reproducing apparatus using such focusing lens, the optical recording medium can be rotated stably by increasing the tilt margin of the focusing lens, and hence it becomes possible to improve stability of recording and reproduction.

Further, with respect to merits of the shape of the lens holding member according to the present invention, the shape of the lens holding member can cope with high refractive index and miniaturization of the solid immersion lens and hence the solid immersion lens can be miniaturized and light-weighted more. Also, in the optical pickup apparatus and the optical recording and reproducing apparatus using such solid immersion lens, servo characteristics such as focusing servo, tracking servo and seek time can be improved and hence it becomes possible to make the optical pickup apparatus and the optical recording and reproducing apparatus become small in size, thin in thickness and high in performance.

Therefore, according to the present invention, since the optical pickup apparatus and the optical recording and reproducing apparatus which are excellent in focusing servo characteristics, tracking servo characteristics and seek characteristics can be realized by the solid immersion lens with the large numerical aperture, it becomes possible to cope with high-density and large-capacity optical recording mediums by using the near field recording and reproducing system.

Furthermore, the present invention is not limited to the materials and arrangements of the above-mentioned respective examples and may take an arrangement containing a curved surface which is provided by slightly curving the difference-in-level portion or the slant face of the lens holding member, for example. Also, the present invention can be modified and changed in various ways such as forming the clearance, provided as the adhesive reservoir, and the concave portion as the curved surface or various kinds of concave and convex shapes without departing from the arrangement of the present invention. Furthermore, it is needless to say that various modifications and changes will also be possible in the solid immersion lens using the lens holding member of the present invention, the focusing lens, the optical pickup apparatus and the optical recording and reproducing apparatus.

According to the lens holding member of the present invention, since the difference-in-level portion and/or the slant face is formed on at least a part of the objective side surface, it is possible to increase the tilt margin between it and the optical recording medium.

Also, according to the lens holding member of the present invention, since the inner side edge portion which is decreased in thickness in the light-concentrating portion of the solid immersion lens is shaped so as to have a spacing between it and the solid immersion lens on the objective side, it is possible to increase the tilt margin between it and the optical recording medium.

Further, according to the focusing lens, the optical pickup apparatus and the optical recording and reproducing apparatus of the present invention, by using the above-mentioned lens holding member of the present invention, it is possible to increase the tilt margin between the focusing lens and the optical recording medium as compared with the related art.

It should be understood by those skilled in the art that various modifications, combinations, sub-combinations and alterations may occur depending on design requirements and other factors insofar as they are within the scope of the appended claims or the equivalents thereof.

What is claimed is:

1. A lens holding member for holding a solid immersion lens in which a convex portion is formed on an objective side surface, said lens holding member being provided so as to open at least a light-concentrating portion provided on said convex portion of said objective side of said solid immersion lens, comprising:
   a difference-in-level portion and/or slant face formed at least on a part of the convex portion of said objective side surface of said solid immersion lens.

2. The lens holding member according to claim 1, further comprising:
   a plurality of difference-in-level portions and/or slant faces on at least a part of the convex portion of said objective side surface of said solid immersion lens.

3. The lens holding member according to claim 1, wherein said lens holding member is shaped like a circular cone, a pyramid or a curved surface at its inner side surface to hold said solid immersion lens.

4. The lens holding member according to claim 1, wherein said solid immersion lens has an objective surface located close to an optical recording medium with a distance shorter than a wavelength of incident laser light.

5. A focusing lens comprising:
   a solid immersion lens in which a convex portion is formed on an objective side surface;
   an optical lens with its optical axis coincident with said solid immersion lens and which is located on an opposite side of said objective side of said solid immersion lens; and
   a lens holding member configured to hold said solid immersion lens to open at least a light-concentrating portion provided on said convex portion of said objective side of said solid immersion lens and including a difference-in-level portion and/or slant face formed at least on a part of the convex portion of said objective side surface of said solid immersion lens.

6. The focusing lens according to claim 5, wherein said solid immersion lens has an objective surface located close to an optical recording medium with a distance shorter than a wavelength of incident laser light.

7. An optical pickup apparatus comprising:
   a focusing lens including at least a solid immersion lens and an optical lens with their optical axes coincident with a light source to converge light emitted from said light source to form a beam spot; and
   a lens holding member configured to hold said solid immersion lens and including difference-in-level portion and/or slant face formed at least on a part of a convex portion of an objective side surface of said solid immersion lens.

8. The optical pickup apparatus according to claim 7, wherein said solid immersion lens has an objective surface located close to an optical recording medium with a distance shorter than a wavelength of incident laser light.

9. An optical recording and reproducing apparatus comprising:
   an optical pickup apparatus configured to focus light at a recording position of an optical recording medium to record and/or reproduce information by a focusing lens comprising a solid immersion lens having a convex portion formed on an objective side surface and an optical lens with its optical axis coincident with that of said solid immersion lens and which is located on the opposite side of said objective side; and
   control drive means for moving said focusing lens and said optical pickup apparatus in the focusing direction and/or tracking direction,
   wherein a lens holding member for holding said solid immersion lens has a difference-in-level portion and/or slant face formed at least on a part of said convex portion of said objective side surface of said solid immersion lens.

10. The optical recording and reproducing apparatus according to claim 9, wherein said solid immersion lens has an objective surface located close to an optical recording medium with a distance shorter than a wavelength of light emitted said light source.

11. A lens holding member for holding a solid immersion lens in which a convex portion is formed on an objective side, the lens holding member comprising:
   a shape having a spacing between it and said solid immersion lens on the objective side at its inner side edge portion which is decreased in thickness in the light-concentrating portion of said solid immersion lens; and
   a concave portion at a position substantially opposing at least a peripheral edge portion of said solid immersion lens on the inner side surface contacting with said solid immersion lens.

12. The lens holding member according to claim 11, wherein said solid immersion lens has an objective surface located close to an optical recording medium with a distance shorter than a wavelength of incident laser light.

13. A focusing lens, comprising:
a solid immersion lens;
an optical lens with its optical axis coincident with that of said solid immersion lens and which is located on an opposite side of an objective side of said solid immersion lens; and
a lens holding member configured to hold said solid immersion lens and including an inner side edge portion protruded toward the objective surface of said solid immersion lens, said inner side edge portion being formed as a shape having a spacing between it and said solid immersion lens on the objective side, and a concave portion at a position substantially opposing at least a peripheral edge portion of said solid immersion lens on an inner side surface contacting with said solid immersion lens.

14. An optical pickup apparatus comprising:
a focusing lens including at least a solid immersion lens and an optical lens with their optical axes coincident with a light source to converge light emitted from said light source to form a beam spot; and
a lens holding member configured to hold said solid immersion lens and including an inner side edge portion protruded toward an objective surface of said solid immersion lens, said inner side edge portion being formed as a shape having a spacing between it and said solid immersion lens on the objective side, and a concave portion at a position substantially opposing at least a peripheral edge portion of said solid immersion lens on an inner side surface contacting with said solid immersion lens.

15. An optical recording and reproducing apparatus comprising:
an optical pickup apparatus configured to focus light at a recording position of an optical recording medium to record and/or reproduce information by a focusing lens including a solid immersion lens having a convex portion formed on an objective side and an optical lens with its optical axis coincident with that of said solid immersion lens and which is located on an opposite side of said objective side;
control drive means for moving said focusing lens and said optical pickup apparatus in the focusing direction and/or tracking direction; and
a lens holding member configured to hold said solid immersion lens and including an inner side edge portion protruded toward the objective surface of said solid immersion lens, said inner side edge portion being formed as a shape having a spacing between it and said solid immersion lens on the objective side, and a concave portion at a position substantially opposing at least a peripheral edge portion of said solid immersion lens on an inner side surface contacting with said solid immersion lens.

* * * * *